3,449,267
PROCESS OF PREPARING TETRAHYDROFURAN-3,3 - BIS(CHLOROMETHYL)OXACYCLOBUTANE COPOLYMERS
Herbert May, Brian John Kendall-Smith, and Robert Hardy Spensley, Birmingham, England, assignors to British Industrial Plastics Limited, London, England, a corporation of the United Kingdom
No Drawing. Filed Feb. 1, 1966, Ser. No. 523,933
Int. Cl. C08g 23/04, 23/14
U.S. Cl. 260—2
19 Claims

ABSTRACT OF THE DISCLOSURE

Tetrahydrofuran and 3,3 - bis(chloromethyl)oxacyclobutane are copolymerized in the presence of a catalytic amount of antimony or arsenic pentafluoride or a complex thereof.

---

This invention relates to high molecular weight thermoplastic coyolymers, suitable for moulding, and to a process for their production.

The invention provides a series of new high molecular weight copolymers, consisting essentially of from 99.9 to 50% of units of the formula

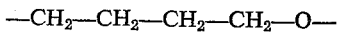

and from 0.1 to 50% of units of the formula

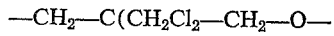

The invention also provides a process for the production of such high molecular weight copolymers which comprises effecting copolymerisation between tetrahydrofuran and 3,3-bis (chloromethyl) oxacylobutane in the presence of a catalytic amount of antimony or arsenic pentafluoride or a complex thereof.

The preferred copolymers are those which contain in random disposition from 1 to 20% of the units having the formula —CH$_2$—C(CH$_2$Cl)$_2$—CH$_2$—O—. The copolymers of the invention, which are hard, rubber-like products having an average molecular weight over 10,000, are particularly useful for injection, compression and extrusion moulding.

The catalysts which may be used in the process of this invention include antimony pentafluoride, arsenic pentafluoride, their coordination complexes and their ionic salt-like compounds. Examples of their coordination complexes are those complexes with organic compounds in which the donor atom is oxygen or sulphur. Examples of these are complexes with alcohols, phenols, acids, ethers, acid anhydrides, ketones, esters, aldehydes, dialkyl sulphides and mercaptans. More especially there may be mentioned the complexes of antimony or arsenic pentafluoride with methanol, ethanol, propanol, butanol, triphenyl methyl alcohol, methyl acetate, butyl acetate, phenyl acetate, benzoic acid, acetic acid, anhydride, acetone, methyl ethyl ketone, dimethyl ether, diethyl ether, methyl phenyl ether, phenol, acetaldehyde, dimethyl sulphide, diethyl sulphide and ethyl mercaptan. The complexes of antimony or arsenic pentafluoride with alkyl cyanides, for example methyl cyanide and ethyl cyanide, are also suitable catalysts for use in the process of the invention, as are the complexes with alkyl, aralkyl, aryl and acyl halides, some of which may be ionic; other examples are the compounds formed when antimony or arsenic pentafluoride is dissolved in certain halogenated paraffins such as 1,1,2 - trichloro - 1,2,2 - trifluoro ethane, and allowed to stand.

Ionic compounds suitable for use as catalysts in the process of the invention are those salts containing the hexafluoroantimate anion, SbF$_6^-$ or the hexafluoroarsenate anion, AsF$_6^-$. Examples are:

(a) Carbonium hexafluoroantimonates, e.g. triphenylmethyl hexafluoroantimonate, diphenylmethyl hexafluoroantimonate, phenyl-ditolymethyl hexafluoroantimonate, tolydiphenylmethyl hexafluoroantimonate, tritolylmethyl hexafluoroantimonate;

(b) Carboxonium hexafluoroantimonates, e.g. dioxolinium hexafluoroantimonate, acetyl hexafluoroantimonate, benzoyl hexafluoroantimonate;

(c) Oxonium and hydroxonium hexafluoroantimonates,, e.g. trialkyloxonium hexafluoroantimonates such as triethyloxonium hexafluoroantimonate, hydroxonium hexafluoroantimonate;

(d) Aryl diazonium hexafluoroantimonates, e.g. phenyl diazonium hexafluoroantimonate;

(e) Iodonium hexafluoroantimonate and substituted iodonium hexafluoroantimonates;

(f) Nitrosyl and nitryl hexafluoroantimonates;

(g) Sulphonium hexafluoroantimonates;

(h) Compounds similar to those in (a) to (g) but with up to three of the fluorine atoms substituted by chlorine, bromine, hydroxyl, alkyl, alkoxy, or fluorosulphonyl, e.g. carbonium pentafluorochloroantimonates, carboxonium pentafluoromethylantimonates, oxonium pentafluorohydroxyantimonates; and (i) Arsenic compounds analogous to those under (a) to (h), i.e. containing the hexafluoroarsenate anion, optionally substituted as in (h).

The process is preferably carried out with the minimum of moisture and suitably under anhydrous conditions. It may be conducted under bulk conditions or it may be of advantage to conduct the polymerisation in an inert liquid medium which may be a solvent or non-solvent for the monomers under the polymerisation conditions. Suitable solvents include saturated aliphatic and cycloaliphatic hydrocarbons, chlorinated aliphatic and cycloaliphatic hydrocarbons, and aliphatic and aromatic nitrohydrocarbons. Cyclohexane is particularly suitable. It is often desirable to mix the comonomers with an inert liquid medium and then to add the catalyst in solution in the same or a different inert medium. For instance, antimony pentafluoride is soluble in the fluorinated hydrocarbons "Arcton" and the "Freons," and a typical way of carrying out the process of the invention is to add a solution of antimony pentafluoride in one or other of these solvents to the comonomers in admixture with, or in solution, in methylene chloride. Many of the antimony pentafluoride and arsenic pentafluoride complexes are soluble in nitroparaffins and thus addition of a solution of the complex in, say, nitroethane or nitropropane to a solution or suspension of the comonomers in cyclohexane or methylene chloride represents another simple way of carrying out the process of the invention.

The reaction should take place between —100° C. and

100° C., preferably between −80° C. and 60° C., and may, if desired, be carried out under a dry inert atmosphere, such as nitrogen or carbon dioxide. Since tetrahydrofuran boils at 64° C., superatmospheric pressure will be required at higher temperatures.

The catalysts of the present invention can readily be removed from the formed polymer by suitable procedures, such as washing, milling or agitating the polymer with solvents or neutralizing agents for the catalysts. The polymer is then thoroughly washed after such treatment to remove all residues and dried.

There may be incorporated into the copolymers formed by the process of the present invention stabilisers, anti-oxidants, pigments, ultra-violet light absorbers and similar materials commonly used as additives to polymeric compositions. The copolymers may also, if desider, be stabilised by treating them with compounds which react with any free end group. For instance, they may be acetylated at the end-group by reaction with acetic acid or acetic anhydride.

The following examples are given for the purpose of illustrating the invention.

Example 1

37.9 g. purified tetrahydrofuran and 1.90 g. bischloromethyloxacyclobutane were stirred rapidly at room temperature and 0.90 ml. of a solution of 0.083 g. triphenylmethyl hexafluoroarsenate in 6.14 mls. nitropropane was added. After 48 hours the highly viscous mixture was stirred with dilute aqueous acetic acid, then with water, and then with acetone to remove residual monomer. The resultant product was dried under vacuum to yield 18 gms. (47%) of a hard rubbery copolymer of melting point 160° C.

Example 2

Example 1 was repeated using 33.0 g. tetrahydrofuran and 9.9 g. bischloromethyloxacyclobutane. The catalyst was 0.5 ml. of a solution of 0.164 g. arsenic pentafluoride-diethyl ether complex in 3.14 mls. nitropropane. The product was 36 gm. (84%) of a very hard rubbery copolymer.

Example 3

Example 1 was again repeated, using 22.0 g. tetrahydrofuran and 3.3 g. bischloromethyloxacyclobutane; the cataylst was 0.7 ml. of a solution of 0.24 g. triethyloxonium hexafluoroantimonate in 13.16 mls. nitropropane, and the product was 17.5 gm. (70%) of a hard rubbery copolymer softening at 130° C. and melting at 160° C.

Example 4

26 g. tetrahydrofuran were distilled under vacuum over sodium diphenyl directly into a reaction flask containing 1.3 g. 3,3-bis-(chloro-methyl)-oxacyclobutane. 0.5 g. of a 1.4% solution of antimony pentafluoride-methyl cyanide complex in nitropropane was injected into the reactants maintained at 20° C. in an atmosphere of dry nitrogen. Polymerisation was allowed to continue for 18 hours and the polymer was recovered by pouring the reaction mixture into excess dilute acetic acid. The aqueous mixture was stirred rapidly for several hours in order to free the copolymer from unreacted tetrahydrofuran and to acetylate the end groups of the copolymer. The acetylated copolymer was dissolved in benzene and the solvent and volatile impurities stripped off under vacuum at 100° C. A stiff rubbery solid with a softening point of about 120° C. was recovered in 45% yield.

Example 5

Example 1 was repeated using 9.4 g. tetrahydrofuran and 0.17 g. bischloromethyloxacyclobutane. The catalyst was 0.22 ml. of a solution of 0.157 g. arsenic pentafluoride-methyl cyanide complex in 1.22 g. nitropropane. The yield was 7 g. (73%) of a stiff rubbery copolymer.

Example 6

Example 1 was repeated using 10.9 g. tetrahydrofuran and 0.3 g. bischloromethyloxacyclobutane. The catalyst was 1.52 ml. of a solution of 0.157 g. triphenylmethyl hexafluoroantimonate in 7.1 g. nitropropane. The yield was 5.9 g. (53%) of a hard rubbery copolymer.

Example 7

Example 1 was repeated using 11.3 g. tetrahydrofuran and 0.31 g. bischloromethyloxacyclobutane. The catalyst was 0.49 ml. of a solution of 0.3 g. antimony pentafluoride diethyletherate in 4.17 g. nitropropane. The yield was 8.3 g. (74%) of a hard rubbery copolymer.

Example 8

Example 1 was repeated using 4.1 g. tetrahydrofuran and 0.62 g. bischloromethyloxacyclobutane. The catalyst was 0.56 ml. of a solution of 0.10 g. paramethylphenyl diazonium hexafluoroarsenate in 5.9 g. nitropropane. Polymerisation was carried out for 2 hours at 50° C. and then for 18 hours at 15° C. The product was a stiff rubbery copolymer.

What is claimed is:

1. A process for preparing a mouldable high molecular weight copolymer consisting essentially of from 99.9 to 50% of units of the formula —CH$_2$CH$_2$CH$_2$CH$_2$O— and from 0.1 to 50% of units of the formula

which comprises effecting copolymerization between tetrahydrofuran and 3,3-bis(chloromethyl) oxacyclobutane in the presence of a catalytic amount of antimony or arsenic pentafluoride or a coordination complex thereof.

2. A process according to claim 1 wherein the copolymerisation is effected at a temperature of from −100° C. to 100° C.

3. A process according to claim 2 wherein copolymerisation is effected at a temperature of from −80% C. to 60° C.

4. A process according to claim 1 wherein the copolymerisation is effected under bulk conditions.

5. A process according to claim 1 wherein the copolymerisation is effected in the presence of an inert liquid medium.

6. A process according to claim 1 wherein the copolymerisation is effected under anhydrous conditions.

7. A process according to claim 1 wherein the copolymerisation is effected under a dry inert atmosphere.

8. A process according to claim 1 wherein the catalyst is a complex of antimony or arsenic pentafluoride with an organic compound whose donor atom is oxygen.

9. A process according to claim 8 wherein the catalyst is a complex of antimony or arsenic pentafluoride with acetic acid.

10. A process according to claim 8 wherein the catalyst is a complex of antimony or arsenic pentafluoride with an ether.

11. A process according to claim 10 wherein said ether is dimethyl ether, diethyl ether, or methyl phenyl ether.

12. A process according to claim 1 wherein the catalyst is a complex of antimony or arsenic pentafluoride with an organic compound whose donor atom is sulphur.

13. A process according to claim 12 wherein said organic compound is a dialkyl sulphide.

14. A process according to claim 13 wherein said dialkyl sulphide is dimethyl sulphide or diethyl sulphide.

15. A process according to claim 1 wherein the catalyst is a complex of antimony or arsenic pentafluoride with an alkyl cyanide.

16. A process according to claim 15 wherein said alkyl cyanide is methyl or ethyl cyanide.

17. A process according to claim 1 wherein the catalyst is a complex of antimony or arsenic pentafluoride with 1,1,2-trichloro-1,2,2-trifluoroethane.

18. A process according to claim 1 wherein the catalyst is a salt containing the hexafluoroantimonate or hexafluoroarsenate anion, or a salt containing the hexafluoroantimonate or hexafluoroarsenate anion in which up to three of the fluorine atoms are substituted by chlorine, bromine, hydroxyl, alkyl, alkoxy or fluorosulphonyl.

19. A process according to claim 18 wherein the catalyst contains one of the following cations: carbonium, carboxonium, oxonium, hydroxonium, aryl diazonium, nitryl, nitrosyl, iodonium, sulphonium.

References Cited

UNITED STATES PATENTS

| | | | |
|---|---|---|---|
| 3,259,590 | 7/1966 | Weissermel et al. | 260—2 |
| 3,379,655 | 4/1968 | May et al. | 260—2 |
| 3,395,124 | 7/1968 | May et al. | 360—67 |

OTHER REFERENCES

Saegusa et al.: "Makromolekulare Chemie," vol. 56, October 1962, pp. 55–64.

Dreyfuss et al.: "Polymer," vol. 6, 1965, pp 93–95.

Saigusa et al.: "Chemical Abstracts," vol. 57 (1962), col. 15346e.

Furukawa: "Chemical Abstracts," vol. 58 (1963), col. 12677e.

Barton: "Chemical Abstracts," vol. 63 (1965), col. 5773–4 (Abstract of British 93,703).

British Ind. Plastics, "Chemical Abstracts," vol. 65 (1966), Cols. 828 and 2370.

SAMUEL H. BLECH, *Primary Examiner.*

U.S. Cl. X.R.

252—429; 260—387, 440, 446